US005887262A

United States Patent [19]

Willhoff

[11] Patent Number: 5,887,262

[45] Date of Patent: Mar. 23, 1999

[54] SMART ANTENNA BACKWARDS COMPATIBILITY IN DIGITAL CELLULAR SYSTEMS

[75] Inventor: Steven J. Willhoff, Richardson, Tex.

[73] Assignee: Nokia Mobile Phones Limited, Salo, Finland

[21] Appl. No.: 741,026

[22] Filed: Oct. 30, 1996

Related U.S. Application Data

[60] Provisional application No. 60/016,363, Apr. 19, 1996.

[51] Int. Cl. $^{6}$ .................................................... H04Q 7/20

[52] U.S. Cl. .......................... 455/452; 455/451; 455/447; 455/25; 455/562

[58] Field of Search .................................... 455/422, 435, 455/446, 447, 450–452, 455, 62, 25, 522, 63, 561, 562, 575

[56] References Cited

U.S. PATENT DOCUMENTS

| | | | |
|---|---|---|---|
| 4,998,078 | 3/1991 | Hulkko | 333/109 |
| 5,341,149 | 8/1994 | Valimaa et al. | 343/895 |
| 5,448,753 | 9/1995 | Ahl et al. | 455/562 |
| 5,504,939 | 4/1996 | Mayrand et al. | 455/450 |
| 5,551,060 | 8/1996 | Fujii et al. | 455/562 |

*Primary Examiner*—Nguyen Vo
*Attorney, Agent, or Firm*—Perman & Green, LLP

[57] ABSTRACT

This invention teaches a method of operating a cellular communication system, and includes the steps of: (a) allocating mobile stations into groups as a function of their ability to support a smart antenna transmission from a base station; and subsequently allocating frequency channels to the groups of mobile stations in accordance with one of a static allocation and a dynamic channel allocation.

20 Claims, 6 Drawing Sheets

SAS

10 MS

10 MS

30 BS

10 MS

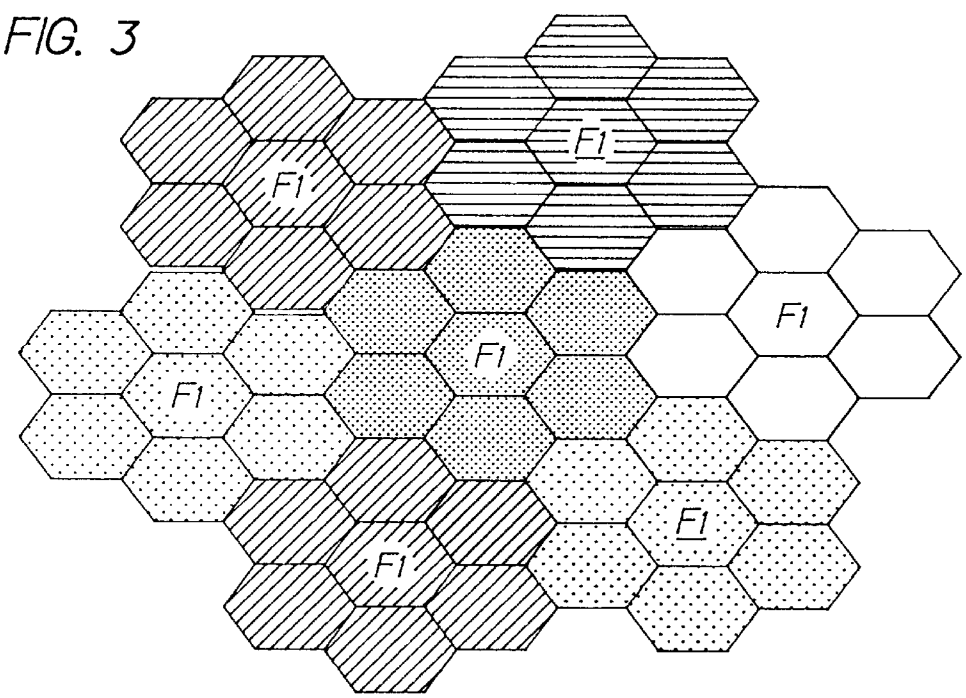
N=7 COCHANNEL REUSE-SAS & NON-SAS ALTERNATING
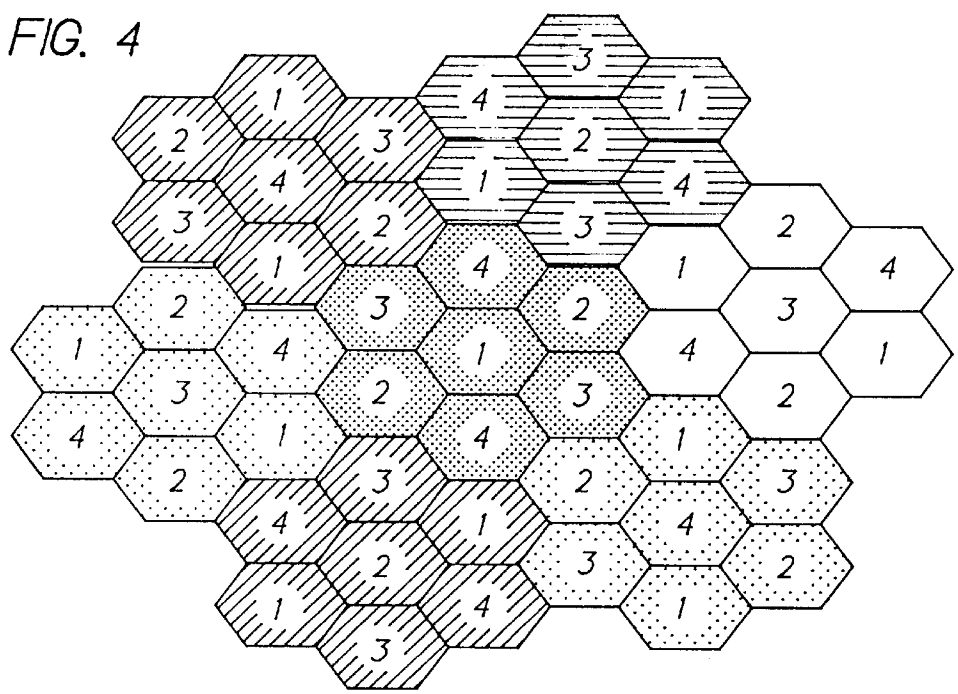
COCHANNEL REUSE-OVERLAY GRIDS
N=7 NON-SAS, N=4 SAS

ADJACENT CHANNEL INTERFERENCE MITIGATION BY ALTERNATING SAS AND NON-SAS

SAS
10
MS
10
MS
30
BS
10
MS 10
12
TRANSMITTER
14A
MOD
14
18
CONTROLLER
DISPLAY
20
22a
22b
KEYPAD
22
DEMOD
16
RECEIVER
16A
17
SPEAKER
19
MICROPHONE
26
SAS
24a
24
MEMORY

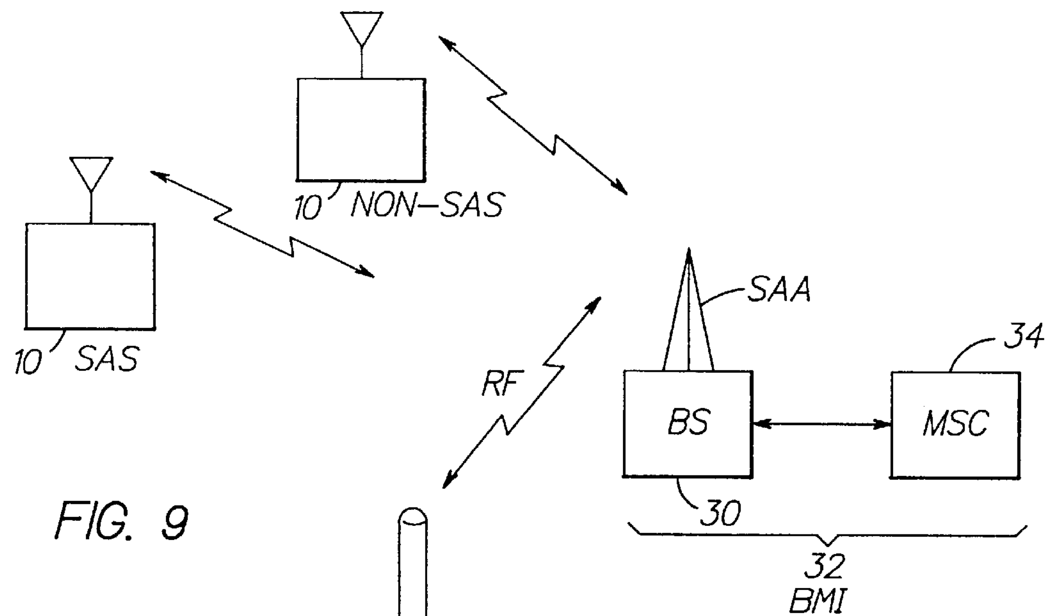
FIG. 9
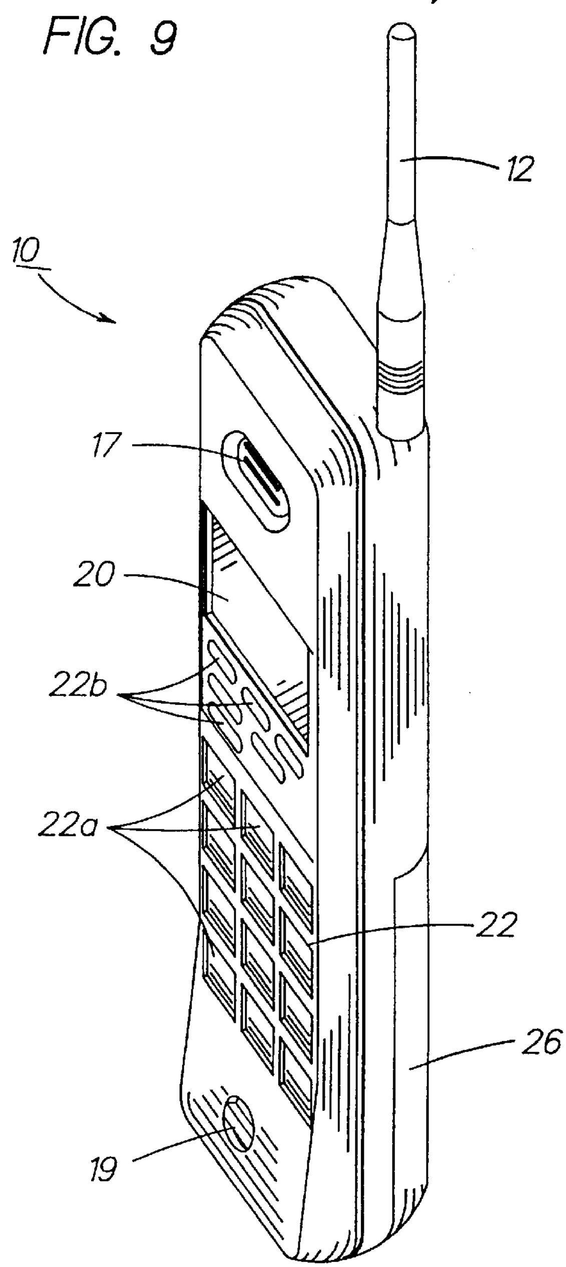

SMART ANTENNA BACKWARDS COMPATIBILITY IN DIGITAL CELLULAR SYSTEMS

CLAIM OF PRIORITY FROM A COPENDING PROVISIONAL PATENT APPLICATION

Priority is herewith claimed under 35 U.S.C. §119(e) from copending Provisional patent application Ser. No. 60/016,363, filed Apr. 19, 1996, entitled "Smart Antenna Backwards Compatibility in IS-136 Systems", by Steven J. Willhoff. The disclosure of this Provisional Patent Application is incorporated by reference herein in its entirety.

1. Field of the Invention

This invention relates generally to wireless communications systems and, in particular, to cellular telephone and personal communicator systems.

2. Background of the Invention

FIG. 1 illustrates a conventional omnidirectional radiation propagation pattern that emanates from a base station of a cellular network or system. The signal is present in all directions from the base station. By contrast, FIG. 2 illustrates a typical directional radiation propagation pattern from a so-called Smart Antenna Array (SAA). As can be seen, the signal is only present in the direction where the intended mobile station is located, relative to the transmitting base station. The so-called SAA antenna thus focuses a narrow beam towards the intended mobile station from a base station. This reduces interference from the call to other calls utilizing the same frequency channel in the system channel reuse plan.

In a Time Division Multiple Access (TDMA) system, the beam directionality needs to be performed on a time slot basis, as each user of the channel is most likely operating in a different direction from the base station.

A problem that arises in such TDMA systems, such as those defined by IS-136 and IS-54B, is that the mobile stations may use unassigned time slots surrounding the assigned time slot(s) for synchronization purposes. The directionality of the beams employed in smart antenna systems may, however, remove the utility of the adjacent time slots as a synchronization reference for these mobile stations, resulting in degraded performance.

A further problem that can be created by the use of the smart antenna approach relates to, by example, IS-136 and IS-54B compatible mobile stations that employ channel measurement processes as an aid in making mobility decisions. These processes encompass Mobile Assisted Hand Off (MAHO) for IS-136 and IS-54B mobile stations, and Mobile Assisted Channel Allocation (MACA and Digital Control Channel (DCCH) Reselection for IS-136 compatible mobile stations. Mobility decisions are facilitated in these systems by the mobile station performing periodic or on-demand measurements of the channels identified for MAHO, MACA, or cell reselection. Unless these channels exhibit a consistent propagation pattern, predictive decisions regarding mobile station location within the cell topology are not possible, without the addition of mechanisms to identify forward channel power and possibly directionality. These types of mechanisms would require the mobile station to synchronize to and decode the forward channel information, rather than simply tune to the channel and perform a power measurement, and are thus not desirable to implement.

OBJECTS OF THE INVENTION

It is a first object of this invention to provide an improved cellular communication system that employs a directional beam between a base station and a mobile station.

It is a second object of this invention to provide an improved cellular system infrastructure that employs a smart antenna, and that is compatible with pre-existing air interface standards, methodologies and channel measurement processes.

SUMMARY OF THE INVENTION

The foregoing and other problems are overcome and the objects of the invention are realized by methods and apparatus in accordance with embodiments of this invention.

This invention teaches a method for a base station to incorporate Smart Antennas into its service area, while maintaining backwards compatibility with earlier mobile stations. The invention teaches a method which allows a Base Station, Mobile Switching Center (MSC) and Interworking Function (BMI) to manage mobile station subscribers that support both current channel/slot assumptions, as well as channel/slot assumptions that exist under a smart antenna scheme.

The invention has the advantage that it allows older mobile stations to interact with the base station, by utilizing adjacent slots for synchronization, and not be impacted by the different channel/slot assumptions required for the new mobile stations operating with the smart antennas.

In accordance with the invention a smart antenna mobile station identifies this capability upon system access (this may be conveyed in the Registration, Origination, Page Response, Capability Report, Subscriber Profile (HLR/VLR/IS-41), or other messages). The BMI allocates the mobile stations requesting call processing resources into groups or pools, depending upon their capability in this regard.

By segmenting the calls into Smart Antenna Savvy (SAS) mobile stations and Non-SAS mobile stations, the BMI provides that only compatible mobile stations share the same channel. This insures that the Non-SAS mobile stations performance is not compromised by uses of the adjacent slots that are inconsistent with the channel/slot assumptions inherent in the Non-SAS mobile stations.

This invention thus teaches, in one aspect, a method of operating a cellular communication system, and includes the steps of: (a) allocating mobile stations into groups as a function of their ability to support a smart antenna transmission from a base station; and subsequently allocating frequency channels to the groups of mobile stations in accordance with one of a static allocation and a dynamic channel allocation.

BRIEF DESCRIPTION OF THE DRAWINGS

The above set forth and other features of the invention are made more apparent in the ensuing Detailed Description of the Invention when read in conjunction with the attached Drawings, wherein:

FIG. 3 depicts a case where N=7 Co-channel Reuse with SAS and Non-SAS Alternating. The channel identified as F1 represents a set of frequency channels used in the reverse plan that utilizes the NON-SAS channel assumptions, while F1 represents a set of channels that utilize the SAS channel assumption.

FIG. 4 depicts a case for Co-channel Reuse with Overlay Grids, and N=7 Non-SAS, N=4 SAS.

FIG. 9 illustrates the mobile station of FIG. 9 in bidirectional wireless communications with a base station.

DETAILED DESCRIPTION OF THE INVENTION

Figure 8:
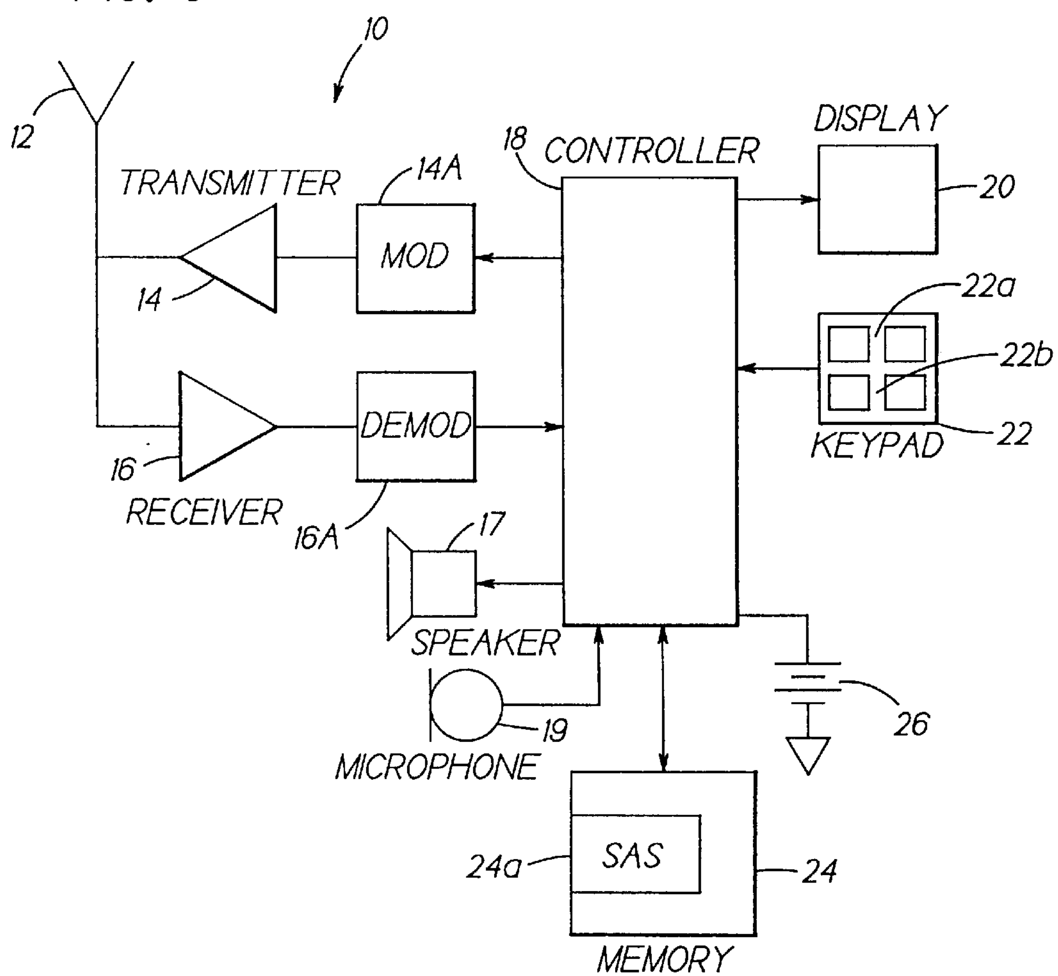
FIG. 8 is a simplified block diagram of a mobile station suitable for practicing this invention.

Reference is made to FIGS. 8 and 9 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a cellular network comprising the Base Station/Mobile Switching Center/Interworking function (BMI) 32 that includes a mobile switching center (MSC) 34. The MSC 34 provides a connection to landline trunks when the mobile station 10 is involved in a call. The base station 30 is assumed for this description to include a Smart Antenna Array (SAA) 30*a*, that is capable of propagating a directional transmission, on a per time slot basis, to those mobile stations 10 that have previously identified themselves as being Smart Antenna Compatible or Savvy (SAS). In general, the SAS mobile stations 10 operate with a different set of assumptions as to the presence of adjacent, non-assigned slots than do the Non-SAS mobile stations 10.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a slotted TDMA frame structure of a type that was described above, although the teaching of this invention is not intended to be limited only to this specific structure, or for use only with an IS-136 compatible mobile station, or for use only in TDMA type systems.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22*a*, and other keys 22*b* used for operating the mobile station 10. These other keys 22*b* may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user.

In accordance with an aspect of this invention the memory 24 includes an information element 24*a* for indicating that the mobile station 10 is SAA compatible. If the mobile station 10 is not SAA compatible, then the information element 24*a* is not present, or is present for specifically indicating that the mobile station 10 is not SAS (Non-SAS). The SAS information element 24*a* is transmitted to the BMI 32 as a part of, by example, a Registration, Origination, Page Response, Capability Report, Subscriber Profile (HLR/VLR/IS-41), or other suitable messages transmitted by the mobile station 10 to the BMI 32 via the base station 30.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with any of a number of other standards besides IS-136 and IS-54B, such as GSM and IS-95 (CDMA). Narrow-band AMPS (NAMPS), as well as TACS, mobile stations may also benefit from the teaching of this invention, as should dual or higher mode phones (e.g., digital/analog (IS-41) or TDMA/CDMA/analog phones). It should thus be clear that the teaching of this invention is not to be construed to be limited to any one particular type of mobile station or air interface standard.

The benefits of the Smart Antenna Array 30*a* approach to wireless communications derives from the directional nature of the radio waves emanating from the smart antenna array. This structure allows the BMI 32 to limit signal propagation solely within a narrow angle oriented towards the receiving mobile station, as is shown in FIG. 2.

The net result of this is an overall reduction in the radio signal propagation intended for a given mobile station 10. This, in turn, reduces the amount of interference present in the frequency reuse grid in the wireless communications system. This basic aspect of Smart Antenna Array technology provides several significant benefits (see, for example, FIGS. 3, 4, 5).

The fact that the Smart Antenna Array is able to direct the signal in a narrow beam towards the intended mobile station 10 allows more latitude for the wireless communications system engineering. This aspect of the Smart Antenna Array 30*a* may be used by the RF/systems engineer to better manage interference within the wireless communications network. These optimizations are discussed below, and are constituent parts of this invention.

Figure 1:
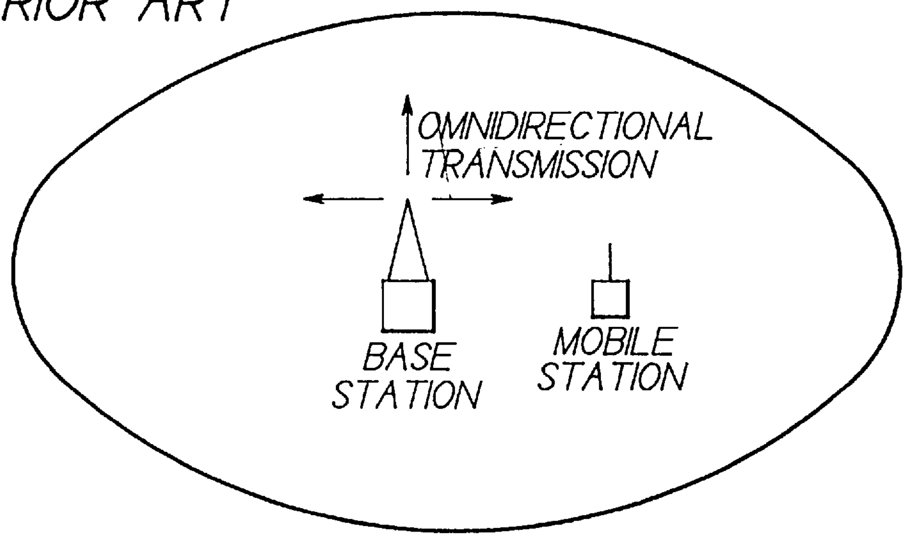
FIG. 1 depicts the typical propagation pattern from a conventional Omnidirectional Antenna. The signal is present equally in all directions relative to the transmitting base station.
Figure 2:
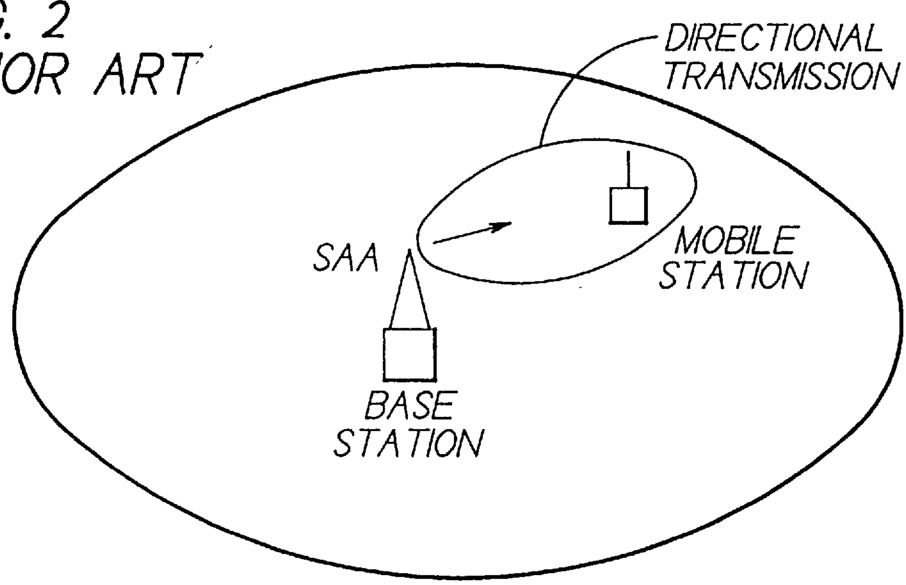
FIG. 2 depicts the typical propagation pattern from a Smart Antenna Array (SAA). The signal is only present in the direction where the intended mobile station is located relative to the transmitting base station.

As can be seen from FIG. 2, the highly directional nature of the Smart Antenna Array significantly reduces or eliminates the amount of radio signal propagated into the portions of the cell in which the mobile station 10 is not physically located. This reduction in signal energy is also realized in the other cells within the Frequency Reuse Grid that employ the same frequency as that used by the mobile station 10 under consideration.

This aspect of the invention can be utilized in frequency planning by alternating usage of the SAS and Non-SAS channel types within the Grid. This is depicted in FIG. 3, in which the SAS frequency channels (e.g., F1) alternate in the grid with non-SAS frequency channels (e.g., F1). Although this scenario is not ideal (it is not possible to achieve total separation with only two alternatives), it does provide for an overall reduction in interference, and hence, an increase in call quality within the system. In general, if a given frequency $f_x$ is used for SAS in F1, then in all adjacent cells $f_x$ is allocated for use by Non-Docket SAS mobile stations.

A second approach may be taken when deploying channels utilizing the SAA 30*a*. This approach enables an increase in call capacity of the system, without increasing the interference level of the system. The second approach is also based on the reduced interference generated by the SAS channel. The interference reduction enables a system planner to institute a denser Frequency Reuse Grid for these channels, while maintaining the existing Frequency Reuse Grid for the non-SAS channels. The reduced interference of the SAS channels allows the distance separating reuse of these frequencies to be reduced, while maintaining the same C/I as the Non-SAS channels.

For example, a modern wireless communications system may deploy its cells with a frequency reuse of N=7 for the non-SAS channels (i.e., a given frequency is reused every seventh cell). This is represented in FIG. 4 by the clusters of seven cells that share the same shading. RF planning takes into consideration the desired C/I for the system, and the propagation environment in which the cell exists, in order to determine the distance that must separate the reuse of Frequency F1.

With the SAS channels, the totality of signal energy propagated into the coverage area is greatly reduced. This has a direct impact on the interference or "I" portion of the C/I target of the system. By reducing the amount of interference, a decrease in the distance needed between the reuse of Frequency F1 is achieved, while maintaining the same C/I ratio. This is depicted in FIG. 4 by the numbers overlaid onto the N=7 Grid (i.e., a cluster of seven adjacent cells). These numbers, ranging from 1 to 4, represent a Frequency Reuse of N=4 that is deployed for the SAS channels. The practical implication of this is that the system is able to accommodate more calls within the geographical coverage area, as the SAS channels may be reused in much closer physical proximity.

Another capability provided through the use of this invention is a mitigation of Adjacent Channel Interference. A practical reality of low cost receiver design is that the energy radiated on a channel typically spills over into the adjacent channels. The amount of adjacent channel interference must be accounted for when allocating frequencies within the frequency plan.

As previously discussed, the overall reduction of signal propagation of the SAS channel may be exploited to handle this engineering and call quality problem. The RF plan may alternate channel use such that a Non-SAS channel has a SAS channel on each side, as depicted in FIG. 5.

Figure 5:
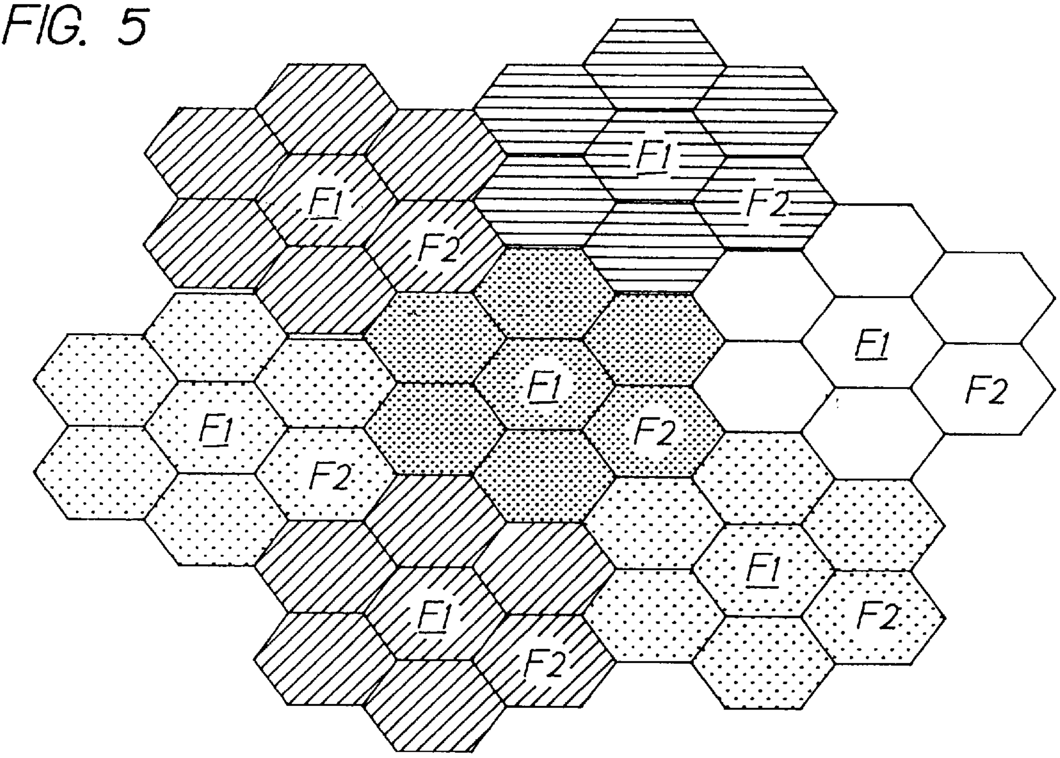
FIG. 5 illustrates a case of Adjacent Channel Interference Mitigation by alternating SAS and Non-SAS.

In FIG. 5, the channel F1 is a SAS channel, and the channel F2 is a non-SAS channel. Channels F1 and F2 are directly adjacent frequencies. Channel F2 sees a reduction in the average amount of Adjacent Channel Interference, due to the directional nature of the SAS channel F1. This is not an ideal scenario, as channel F1 experiences the same level of Adjacent Channel Interference experienced with conventional antenna deployments. However, the net effect within the system is that some channels see an increase in call quality, without a degradation to the other channels.

One of the traditional mechanisms that wireless systems operators have employed to accommodate increased subscriber demand is to split cells into smaller sized cells. While this approach succeeds to a point, it is often the case that sectorization is used to provide additional capacity requirements. Sectorization uses fixed directional antennas to subdivide the cell into discrete coverage areas (effectively creating wedge shaped cells that share a common cell site).

This technique has been effective in reducing interference; although there is one serious drawback. More particularly, the trunk group efficiency of a sectorized cell is greatly degraded, as the number of channels available in the cell are divided among all of the sectors.

By example, consider an N=7 reuse plan that deploys omnidirectional cells. Under a current U.S. 800 MHz operating license, there are a total of 416 channels available. Of these, 21 are reserved for Control Channel use. This leaves 395 channels available for subscriber use, or approximately 56 per cell. If this system is sectorized with 120 degree antennas (three sectors per cell), the 56 available channels are allocated to the three sectors. This leaves approximately 18 channels per sector. In an IS-136 system, these channels may be used for either Analog calls (one call per channel) or TDMA calls (three calls per channel).

For illustrative purposes, assume that one half of the calls are Analog and one half are TDMA. This implies that an omnidirectional cell can support 112 calls, anywhere within the cell coverage area (even if all of the mobile stations are located in the same place within the cell (a so-called "hot spot"). The sectorized cell, on the other hand, can also support 112 calls, provided that the mobile stations are equally distributed among all three of the sectors. In the very possible situation that all of the mobile stations desiring service are located at the same place within the cell, only 36 calls may be completed, with the rest being unable to obtain service (as there are only 18 channels available within the sector).

The deployment of SAS channels in accordance with this invention overcomes this problem, by simultaneously reducing interference (the goal of sectorization) while maintaining the omnidirectional cell topology. This serves to maintain the higher number of channels within the trunk group, preserving full service capability for hot spots, while also enabling higher density similar to that afforded by sectorization.

While the foregoing description has related to channel allocation strategies, the following description is oriented towards segregating the SAS and Non-SAS channels into allocation groups or pools in accordance with this invention.

As discussed above, in order for the smart antenna technology to be introduced into IS-136 systems there is a segregation of channel types, to appropriately serve both the installed base of Non-SAS mobile stations and SAS mobile stations. One effective method for realizing this requirement is to segregate the channels into two allocation pools. Whenever a mobile station 10 requests service requiring a traffic channel, a channel from the appropriate pool is allocated for that mobile station 10.

Figure 10:
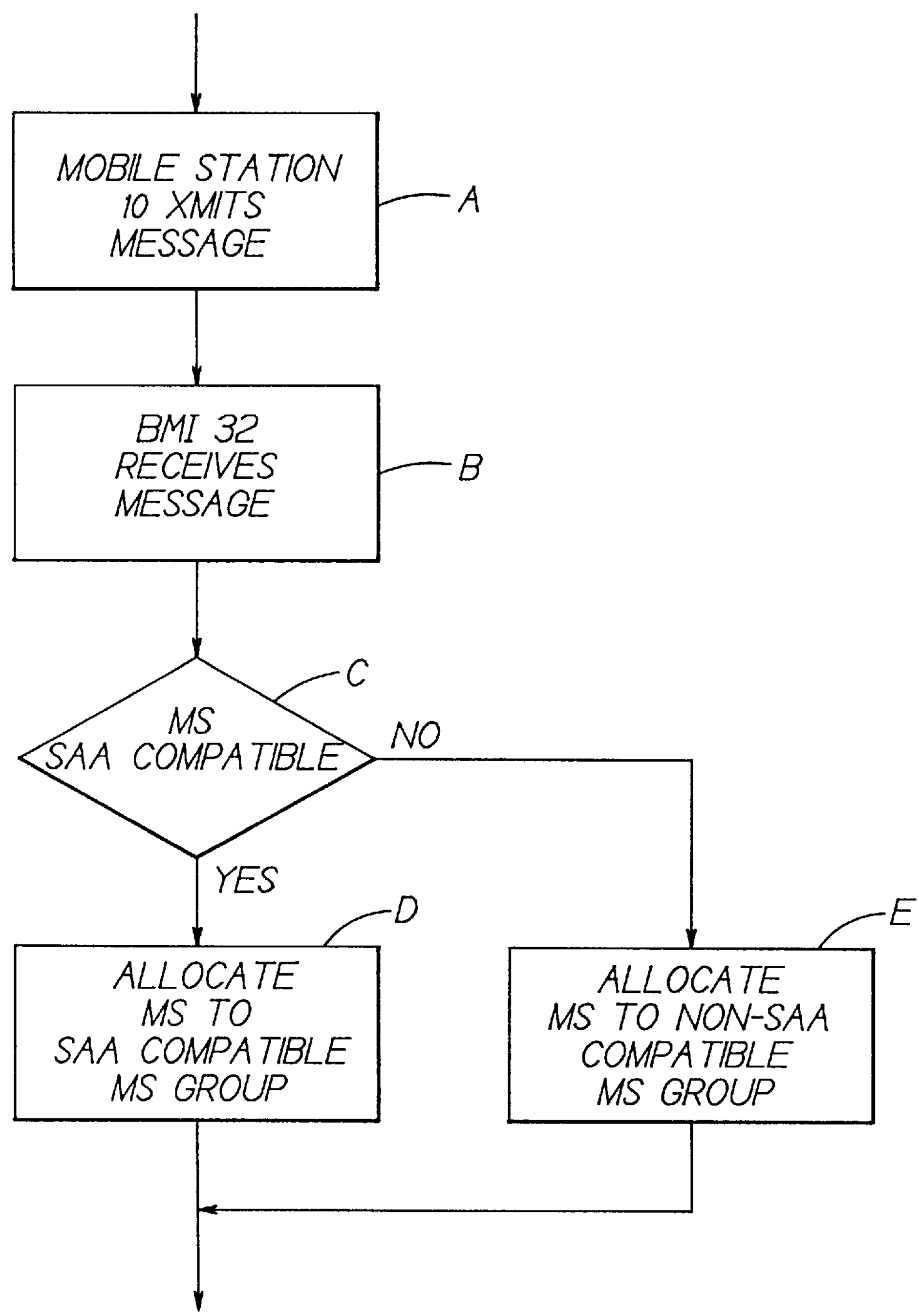
FIG. 10 is a logic flow diagram in accordance with a method of this invention.

Reference can be to FIG. 10. At Block A the mobile station transmits a message to the BMI 32 via the base station 30. The message may be, by example, a Registration, Origination, Page Response, Capability Report, Subscriber Profile (HLR/VLR/IS-41), or other message. If the mobile station 10 is capable of operation with the SAA, the message includes the SAS information element 24a that is stored in the memory 24. At Block B the BMI 32 receives the message, and at Block C the BMI 32 determines if the mobile station 10 is SAA compatible, such as by testing for the presence of the SAS information element. If the determination at Block C is Yes, control passes to Block D where the BMI 32 assigns the mobile station 10 to a group of SAA compatible mobile stations. If the determination at Block C is No, control passes to Block E where the BMI 32 assigns the mobile station 10 to a group of Non-SAA compatible mobile stations. Processing then continues so as to subsequently manage a call made by the mobile station 10 in either the SAA mode (directional transmission) or the Non-SAA (omnidirectional transmission) mode.

By grouping the mobile stations 10 into SAA mobile stations and Non-SAA mobile stations, the BMI 32 insures that only mutually compatible (SAS or Non-SAS) mobile stations 10 share the same frequency channel. This further insures that the Non-SAS mobile stations 10 performance is not compromised by uses of adjacent slots that are inconsistent with the channel/slot assumptions inherent in the Non-SAS mobile station 10.

The BMI 32 may utilize at least two methodologies to perform these functions. A first method involves a static allocation of frequency channels into Non-SAA and SAA allocation pools. While this is the easiest method to implement, it is not very flexible, and cannot accommodate fluctuations in usage demand. By example, if a Non-SAS mobile station 10 desires service, and only SAS channels are available, the call cannot be completed.

A second, more flexible method dynamically allocates channels to the pools based on current usage. This implies that the base station equipment is capable of operating in both SAS and Non-SAS modes. A clear advantage to this method is that the system is able to respond to changing usage requirements without any cumbersome re-engineering. The system is thus adaptive to the traffic demands.

One aspect of current deployments maintain constant output power on all time slots with the Smart Antenna. The direction and output power of the forward channel is controlled. By following the requirements enumerated previously in this regard for the special channel use (DCCH Reselection, MAHO, and MACA), the remaining channels in the system may be SAS channels. The system deployment of these channels can further increase overall call quality by utilizing forward channel power control.

Given that the SAS channel has no dependency on adjacent time slots within the channel, and the base station 30 is performing per time slot manipulations on the transmitted signal, it becomes possible to further enhance the method with changes in the output power on a per time slot basis.

Figure 6:
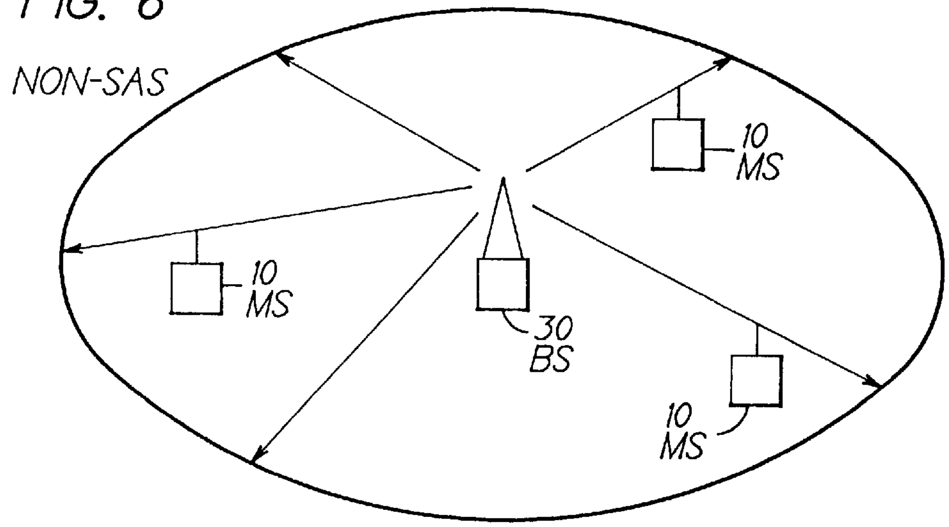
FIG. 6 illustrates an Omnidirectional Propagation Pattern with constant forward power to Non-SAS mobile stations.
Figure 7:
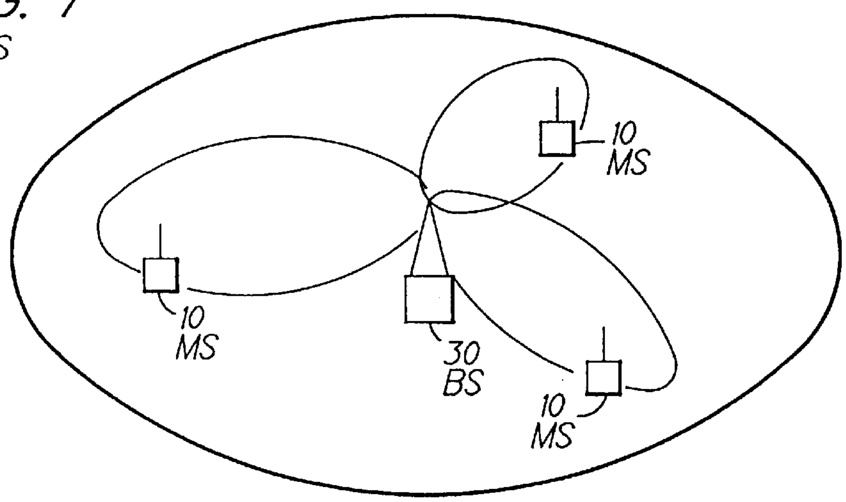
FIG. 7 illustrates a Smart Antenna Propagation Pattern with forward power control to SAS mobile stations.

This method of operation is depicted in FIGS. 6 and 7. FIG. 6 shows the signal propagation encountered when forward power remains constant. As previously discussed, there are certain situations in which this is essential for the correct operation of the system. However, for the SAS channels, this is not necessary, or even desirable. All of the embodiments discussed above with respect to interference reduction also apply to the forward channel power control. By reducing the forward power of frequency channel set F1 to only that needed for the mobile station 10 utilizing that slot, the amount of interference seen by the same slot on the reuses of F1 within the grid is thus beneficially further reduced.

In greater detail, FIG. 7 depicts the power footprints of the base station transmission to three mobile stations 10 utilizing the time slots of frequency f1. Note that the distance the signal propagates is directly related to the distance the mobile station 10 is from the base station transceiver, since the power for each signal is adjusted on a time slot basis as a function of the distance of the receiving mobile station 10 from the base station 30. This distance can be determined from, by example, time alignment information and/or a received signal strength from the mobile stations.

The invention also prevents a problem from occurring when the BMI 32 utilizes traffic channels in the Mobile Assisted Handoff (MAHO) procedures. In order for consistent MAHO measurements to be made, the measured channel needs to provide constant power output, in all directions. This typically does not occur when directed beams are transmitted on a per time slot basis. The benefit to MAHO operation is that the BMI 32 only identifies channels utilized by Non-SAS mobile stations 10 for the MAHO channel list that it transmits to the mobile stations 10. That is, the neighbor channel list contains frequency channels that have been allocated for NON-SAS mobile station use.

A similar consideration is made for the use of Mobile Assisted Channel Allocation (MACA). Once again, by employing this invention, the BMI 32 insures that only those channels employing the Non-SAS channel/slot assumptions appear in the MACA channel lists.

The integrity of both MAHO and MACA are dependent on the channel/slot assumptions of the non-SAS mobiles. These functions rely on constant power output on the channel.

A similar consideration is made for DCCH Reselection. In order to properly navigate throughout the system, the mobile station 10 relies on channel measurements for neighboring DCCHs. By the BMI 32 insuring that the DCCHs are deployed exclusively on non-SAS operating channels, this important system function is not compromised.

While the invention has been particularly shown and described with respect to preferred embodiments thereof, it will be understood by those skilled in the art that changes in form and details may be made therein without departing from the scope and spirit of the invention.

What is claimed is:

1. A method of operating a cellular communication system, comprising the steps of:

allocating mobile stations into groups as a function of their ability to support a directional antenna transmission from a base station, wherein a first group of mobile stations have an ability to support the directional antenna transmission from the base station and wherein a second group of mobile stations do not have an ability to support the directional antenna transmission from the base station; and allocating frequency channels to the first and second groups of mobile stations in accordance with a predetermined frequency channel allocation.

2. A method as in claim 1, wherein the predetermined frequency channel allocation is comprised of a static frequency channel allocation.

3. A method as in claim 1, wherein the predetermined frequency channel allocation is comprised of a dynamic frequency channel allocation.

4. A method of operating a TDMA cellular communication system, comprising the steps of:

transmitting a message from a mobile station to a base station;

determining if the message includes information for specifying that the mobile station is capable of operation with a directional antenna transmission from the base station; and if the message does include the information, assigning the mobile station to one of a set of first frequency channels associated with a first group of mobile stations that are all capable of operation with a directional antenna transmission; else if the message does not include the information, assigning the mobile station to one of a set of second frequency channels associated with a second group of mobile stations that are all capable of operation with only an omnidirectional antenna transmission.

5. A method as set forth in claim 4, wherein for the mobile stations assigned to the first group, comprising the further step of transmitting to each of the mobile stations at a per time slot basis with a power level that is a function of a distance to the mobile station.

6. A method as set forth in claim 4, wherein for the mobile stations assigned to the second group, comprising the further step of transmitting to each of the mobile stations with a same power level.

7. A method as set forth in claim 4, wherein the set of first frequency channels are spatially distributed with a first frequency reuse plan of N, wherein the set of second frequency channels are spatially distributed with a second frequency reuse plan of M, and where N<M.

8. A method as set forth in claim 4, wherein the steps of assigning are based on a static allocation of frequency channels.

9. A method as set forth in claim 4, wherein the steps of assigning are based on a dynamic allocation of frequency channels as a function of demand.

10. A method as set forth in claim 4, and further comprising an initial step of assigning at least one digital control channel to one of the second frequency channels.

11. A method as set forth in claim 4, and further comprising a step of transmitting a neighboring frequency channel measurement list to the second group of mobile stations, wherein all of the frequency channels in the list are one of the second frequency channels.

12. A cellular communication system, comprising:

means for allocating mobile stations into groups as a function of their ability support a directional antenna transmission from a base station, wherein a first group of mobile stations have an ability to support the directional antenna transmission from the base station and wherein a second group of mobile stations do not have an ability to support the directional antenna transmission from the base station; and means for allocating frequency channels to the first and second groups of mobile stations in accordance with a predetermined frequency channel allocation.

13. A TDMA cellular communication system, comprising:

a mobile station;

a base station;

means for transmitting a message from the mobile station to the base station;

means for determining if the message includes information for specifying that the mobile station is capable of operation with a directional antenna transmission from the base station; and means for assigning, responsive to the message including the information, the mobile station to one of a set of first frequency channels associated with a first group of mobile stations that are all capable of operation with a directional antenna transmission, the means for assigning also being responsive to the message not including the information for assigning the mobile station to one of a set of second frequency channels associated with a second group of mobile stations that are all capable of operation with only an omnidirectional antenna transmission.

14. A system as set forth in claim 13, and further comprising means for transmitting, to each of the mobile stations assigned to the first group, on a per time slot basis with a power level that is a function of a distance to the mobile station.

15. A system as set forth in claim 13, and further comprising means for transmitting, to each of the mobile stations assigned to the second group, with a same power level.

16. A system as set forth in claim 13, wherein the set of first frequency channels are spatially distributed with a first frequency reuse plan of N, wherein the set of second frequency channels are spatially distributed with a second frequency reuse plan of M, and where N<M.

17. A system as set forth in claim 13, wherein the means for assigning employs a static allocation of frequency channels.

18. A system as set forth in claim 13, wherein the means for assigning employs a dynamic allocation of frequency channels as a function of demand.

19. A system as set forth in claim 13, and further comprising means for first assigning at least one digital control channel to one of the second frequency channels.

20. A system as set forth in claim 13, and further comprising means for transmitting a neighboring frequency channel measurement list to the second group of mobile stations, wherein all of the frequency channels in the list are one of the second frequency channels.

* * * * *